UNITED STATES PATENT OFFICE.

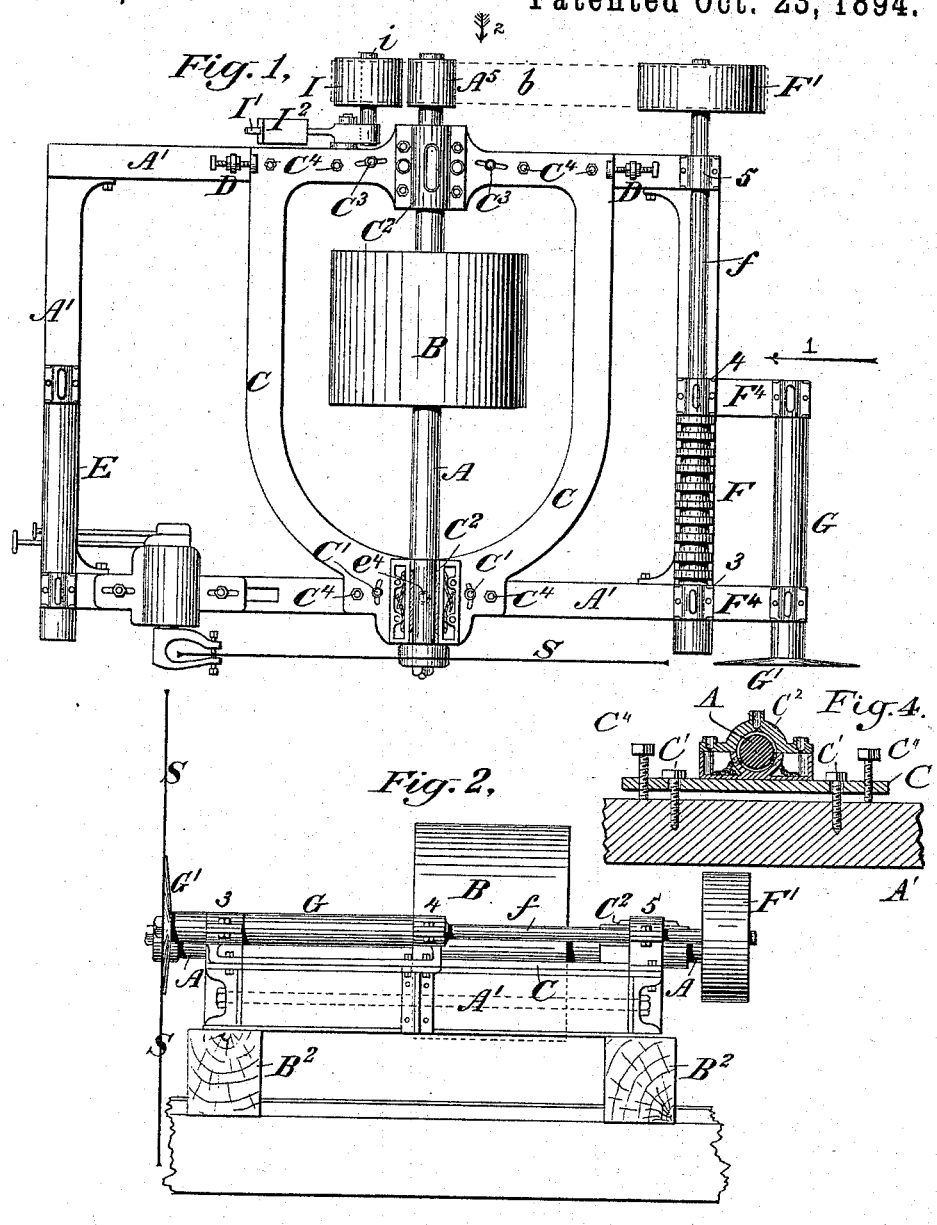

MICHAEL GARLAND, OF BAY CITY, MICHIGAN.

SAWING-MACHINE.

SPECIFICATION forming part of Letters Patent No. 528,088, dated October 23, 1894.

Application filed February 21, 1894. Serial No. 501,060. (No model.)

*To all whom it may concern:*

Be it known that I, MICHAEL GARLAND, of Bay City, in the county of Bay and State of Michigan, have invented a certain new and useful Improvement in Sawing-Machines; and I do hereby declare that the following is a full, clear, and exact description of the same, reference being had to the accompanying drawings, forming part of this specification.

My invention relates to circular saw mills, or machines, and has for its main object to provide for use a machine of this type, which shall be capable of more efficient operation than those heretofore made.

To this main end and object, my invention consists in the novel structural features and combinations of devices, that will be found hereinafter fully described, and that will be most particularly pointed out in the claims of this specification.

To enable those skilled in the art to which my invention relates, to make and use circular saw mills embodying the latter, I will now proceed to more fully describe my improvements, referring, by letters and figures, to the accompanying drawings, which form part of this specification, and in which I have shown my invention embodied in a machine of that form, which I have so far used in carrying my invention into effect.

In the drawings, Figure 1 is a partial top view of a circular sawing machine embodying the several parts, or features, of my invention. Fig. 2, is a partial end view of the same, looking in the direction indicated by the arrow of Fig. 1. Fig. 3 is a detail partial elevation, as per arrow at Fig. 1, to show particularly the arrangement of belt and pulleys by which power is derived from the saw mandrel, to drive the live feed roll of the machine. Fig. 4 is a sectional detail of the mechanism for adjusting the frame and mandrel.

In the several figures, the same part will be found always designated by the same letter or numeral of reference.

A' is the lower, main portion of the husk, or frame, of the machine, which, as shown, is comprised of suitable castings, securely bolted together, and mounted upon suitable floor beams, or foundational timbers, $B^2$. This lower husk, or frame A' carries, at one end, a dead roll, or idler, E, the outer end of which extends up to within a short distance of the adjacent end of the head-block of the log-carriage; and which is journaled, in suitable boxes, on the frame A', as shown, so that the uppermost part of its peripheral surface lies in a plane about one-quarter of an inch below the plane of the upper surface of the said head-block. At the opposite end of the frame A' is mounted, in suitable journal-boxes, 3, 4, 5, the shaft $f$, of a live roll F; which is, preferably a sectional feed-roller (such as shown) with a plain cylindrical projecting end that, like the end of the dead roll, E, extends up to near the line of travel of the carriage head-block and has its topmost surface about a quarter of an inch below the level of the top surface of the said head-block. The shaft $f$ is provided with a fast pulley F', that is driven by a belt $b$, in a manner to be presently explained.

In journal boxes, on the outer ends of the projecting arms, or brackets, $F^4$ of the frame A', is mounted, as shown, a dead roll, or idler G, like the one marked E; but carrying on its outer projecting end a spreader G', such as commonly used for a purpose well understood by those skilled in the art.

Mounted on top of the frame A' is another frame, or husk, C; which carries the saw mandrel A, provided, as usual, with a pulley B, and having mounted fast on its outer, or front, end the circular saw S. The journal boxes $C^2$, $C^2$, of the upper husk, in which is mounted the saw mandrel A, are, preferably, of the construction shown and described in United States Letters Patent, granted to me March 13, 1888, (I have shown one of the boxes in Fig. 1, with the cap off to expose the internal construction;) and on the rear projecting end of said mandrel is a small fast pulley $A^5$ (see Fig. 1), which acts, through the medium of devices I will now describe, to drive the feed-roll F. This drive pulley $A^5$, it will be observed, is in line with the pulley F' that is fast on the shaft F; and, in line also with pulley $A^5$, and rather close to it (but on the opposite side of it, to that on which pulley F' is located) is arranged an idler pulley I, that serves the double function of a tightener of, and a wheel over which to band, the endless belt $b$ (see Fig. 3), and the relative arrangement of the three pulleys F'; $A^5$; and L, and the endless belt $b$, is such, it will be seen, that while the said belt is banded over, or partially around, each of the wheels F' and I, both runs of the belt pass below the drive-pulley $A^5$, which, however, bears, peripherally, on the top surface of the upper run of the belt, as clearly shown at Fig. 3 of the drawings; and by means of this, combination and arrangement of the said pulleys and belt, is the driver $A^5$ of the rapidly rotated saw mandrel, rendered capable of imparting the requisite power and motion to the shaft $f$, of the live, or feed, roller, F.

The upper husk, or saw mandrel frame C, is adjustable, both laterally and vertically (in a manner and for purposes which I will presently explain), and to insure the perfect operativeness of the belt and pulley mechanism just above described, under all variations which may be necessary, as to the position, of the pulley $A^5$, which, as before explained, is fast on the end of shaft A, and, therefore, must move whenever the rear end of the frame C may be moved, I have mounted the idler and tightener I on a stud, or arbor, $i$, that projects from (and is fast to) the shorter arm of a lever I' which, in turn, is pivoted, or fulcrumed, as shown, on a stud projecting from the frame C, and carries on its longer arm an adjustable weight $I^2$. By these means, it will be seen, the weight $I^2$, through the medium of the vibratory arm, or lever I', serves to hold and press upwardly, to its work, the tightener pulley I, around which the belt $b$ is banded, and thus insure a forcible contact of the upper run of the belt with the periphery of the driver $A^5$, no matter what (comparatively slight) changes in the position, or locality, of said pulley may result from either vertically, or laterally, adjusting the frame C. The said frame is, as shown, made of a length sufficient to span the width of frame A'; but of a width only about sufficient to yoke around and clear the saw mandrel pulley B, and said frame, or upper husk, C, is connected, at its forward end, to frame A', by means of a vertical pivot, or trunnion, at $e^4$, round about which pivotal connection, said husk may be slightly moved, or vibrated, by means of the adjusting devices, or set screws, seen at D, D, (see Fig. 1,) such vibratory adjustment of the husk C being for the purpose of setting the saw S, as occasion may require, in perfect alignment with the log carriage track, or "practically true with the track."

The devices I have shown at D, for moving and holding in place laterally, the vibratory end of the husk, are set screws working in upwardly projecting stands of the lower frame, or casting, A', and provided with proper jam-nuts; and, at C' and $C^3$, I have shown vertically arranged securing bolts, which pass through oblong apertures in the frame C, for securing the frame in place vertically, after having been set, or adjusted, as just explained; but any other suitable means for effecting the necessary movements of the rear end of the frame, and for securely holding it in place, vertically, may, of course, be employed.

It may be desirable and necessary to sometimes adjust the husk, or frame, C, vertically, at one, or the other end; in order to level-up the saw mandrel (to cause the saw S to lie in the proper plane vertically) and to accomplish this desired end, I provide the frame C with a series of adjusting screws $C^4$, as shown in Fig. 4, (preferably, two at the forward and four at the broader, rear end,) by means of which (when the securing and adjusting screws C', $C^3$ and D are loosened), the husk may be slightly raised, or lowered, at one, or the other, end; there being allowed sufficient play in all the other bolt connections to permit this vertical adjustment.

It will be seen that by having the two boxes $C^2$ of the saw mandrel immovable on the husk G, they must always remain perfectly in line; while by having the husk adjustable laterally, round about the pivoted point $e^4$, the saw S can be easily adjusted to a perfect alignment with the line of motion of the log-carriage, or with the carriage-track; and it will be understood that in this structural feature of adjustment lies the pith of my improvement, in this direction, irrespective of the particular means, or devices, employed for effecting such adjustment.

By reason of the combination of the two frames, with the journal boxes of the saw mandrel immovable on the upper one, and said upper frame made movable relatively to the lower frame, I am enabled to vary the plane of the saw vertically, and yet keep all the working parts in perfect relationship, and this structural feature I consider an important one in my improved machine.

Having now so fully described my improved machine that those skilled in the art can make and use circular sawing machines embodying either wholly or in part the several features invented by me, what I claim as new, and desire to secure by Letters Patent, is—

1. In a circular, log saw mill, the combination, with a lower, stationary, main frame; and an upper movable husk, carrying the saw mandrel and its boxes, of means for adjusting the said upper husk to vary the plane of the saw by an elevation, or depression, of either end of the mandrel; substantially as and for the purpose set forth.

2. In a circular, log saw mill, the combination, with a lower stationary frame, or husk; and a husk mounted thereon and carrying the saw mandrel and its journal boxes, of means for swiveling the upper husk horizontally to vary the plane of the saw relatively to the line of travel of the log-carriage; and means for raising and lowering either the forward, or rear, portion of said upper husk, to vary the plane of the saw, relatively to a vertical line; all substantially as hereinbefore set forth.

In witness whereof I have hereunto set my hand this 17th day of October, 1893.

MICHAEL GARLAND.

In presence of—
MORRIS L. COURTRIGHT,
JOHN E. SIMONSON.